(12) United States Patent
Shpak

(10) Patent No.: US 8,588,844 B2
(45) Date of Patent: Nov. 19, 2013

(54) MIMO SEARCH OVER MULTIPLE ACCESS POINTS

(75) Inventor: Eran Shpak, Tel Aviv (IL)

(73) Assignee: Extricom Ltd., Tel Aviv (IL)

( * ) Notice: Subject to any disclaimer, the term of this patent is extended or adjusted under 35 U.S.C. 154(b) by 311 days.

(21) Appl. No.: 12/939,191

(22) Filed: Nov. 4, 2010

(65) Prior Publication Data

US 2012/0115523 A1 May 10, 2012

(51) Int. Cl.
*H04B 7/00* (2006.01)

(52) U.S. Cl.
USPC ............................ 455/525; 455/524; 370/338

(58) Field of Classification Search
USPC ................. 455/507, 101, 525, 524, 500, 103; 370/331, 334, 338, 328, 332
See application file for complete search history.

(56) References Cited

U.S. PATENT DOCUMENTS

| | | | |
|---|---|---|---|
| 4,581,734 A | 4/1986 | Olson et al. | |
| 4,789,983 A | 12/1988 | Acampora et al. | |
| 4,935,925 A | 6/1990 | Williams et al. | |
| 5,280,472 A | 1/1994 | Gilhousen et al. | |
| 5,570,352 A | 10/1996 | Poyhonen | |
| 5,644,576 A | 7/1997 | Bauchot et al. | |
| 5,696,903 A | 12/1997 | Mahany | |
| 5,787,085 A | 7/1998 | Fox | |
| 5,825,758 A | 10/1998 | Heikkinen et al. | |
| 5,842,117 A | 11/1998 | Rosenberg et al. | |
| 5,912,921 A | 6/1999 | Warren et al. | |
| 5,923,702 A | 7/1999 | Brenner et al. | |
| 5,960,344 A | 9/1999 | Mahany | |
| 5,982,779 A | 11/1999 | Krishnakumar et al. | |
| 6,028,866 A | 2/2000 | Engel et al. | |
| 6,047,175 A | 4/2000 | Trompower | |
| 6,097,705 A | 8/2000 | Ben-Michael et al. | |
| 6,192,026 B1 | 2/2001 | Pollack et al. | |
| 6,196,456 B1 | 3/2001 | Taylor | |
| 6,259,898 B1 | 7/2001 | Lewis | |

(Continued)

FOREIGN PATENT DOCUMENTS

| | | | |
|---|---|---|---|
| DE | 19830449 A | 1/2000 | |
| EP | 0955565 A2 | 11/1999 | |

(Continued)

OTHER PUBLICATIONS

Arai et al., "A hybrid indoor data network with radio and wire performance evaluation in a Rayleigh channel", Proceedings of the 11th Annual International Phoenix Conference on Computers and Communications, pp. 255-259, Scottsdale, USA, Apr. 1-3, 1992.

(Continued)

*Primary Examiner* — Nay A Maung
*Assistant Examiner* — Angelica M Perez
(74) *Attorney, Agent, or Firm* — D. Kligler I.P. Services Ltd.

(57) ABSTRACT

A method for communication includes arranging multiple access points in a wireless local area network (WLAN) to communicate over the air with a station in a multiple-input multiple-output (MIMO) configuration. Transmission quality is measured, in alternation, between two or more of the access points and the station in a plurality of different MIMO states. Each MIMO state is characterized at least by a respective number of spatial streams to be transmitted in the state. Responsively to the measured transmission quality, one of the access points and one of the MIMO states are selected to transmit data to the station.

12 Claims, 2 Drawing Sheets

(56) References Cited

U.S. PATENT DOCUMENTS

| | | |
|---|---|---|
| 6,295,461 B1 | 9/2001 | Palmer et al. |
| 6,381,458 B1 | 4/2002 | Frodigh et al. |
| 6,393,261 B1 | 5/2002 | Lewis |
| 6,393,262 B1 | 5/2002 | Muhlbauer et al. |
| 6,463,303 B1 | 10/2002 | Zhao |
| 6,505,045 B1 | 1/2003 | Hills et al. |
| 6,529,164 B1 | 3/2003 | Carter |
| 6,560,443 B1 | 5/2003 | Vaisanen et al. |
| 6,560,448 B1 | 5/2003 | Baldwin et al. |
| 6,567,396 B1 | 5/2003 | Pohjanvouri et al. |
| 6,580,704 B1 | 6/2003 | Wellig et al. |
| 6,590,884 B1 | 7/2003 | Panasik |
| 6,636,737 B1 | 10/2003 | Hills et al. |
| 6,671,284 B1 | 12/2003 | Yonge, III et al. |
| 6,671,495 B1 | 12/2003 | Lappetalainen et al. |
| 6,674,403 B2 | 1/2004 | Gray et al. |
| 6,675,015 B1 | 1/2004 | Martini et al. |
| 6,690,943 B1 | 2/2004 | Forde et al. |
| 6,711,148 B1 | 3/2004 | Hills |
| 6,732,163 B1 | 5/2004 | Halasz |
| 6,741,643 B1 | 5/2004 | McGibney |
| 6,771,933 B1 | 8/2004 | Eng et al. |
| 6,785,558 B1 | 8/2004 | Stratford et al. |
| 6,799,054 B2 | 9/2004 | Shpak |
| 6,801,767 B1 | 10/2004 | Schwartz et al. |
| 6,807,146 B1 | 10/2004 | McFarland |
| 6,823,177 B1 | 11/2004 | Lucidarme |
| 6,852,794 B2 | 2/2005 | Puhala et al. |
| 6,870,822 B2 | 3/2005 | Balogh |
| 6,907,229 B2 | 6/2005 | Shpak |
| 6,917,804 B2 | 7/2005 | Takayama et al. |
| 6,925,461 B2 | 8/2005 | Byers |
| 6,947,483 B2 | 9/2005 | Engwer |
| 6,965,942 B1 | 11/2005 | Young et al. |
| 6,968,198 B2 | 11/2005 | Nylund |
| 7,016,328 B2 | 3/2006 | Chari et al. |
| 7,020,442 B2 | 3/2006 | Najafi et al. |
| 7,028,186 B1 | 4/2006 | Stenman et al. |
| 7,035,243 B2 | 4/2006 | Shpak |
| 7,046,690 B2 | 5/2006 | Sherman |
| 7,047,046 B2 | 5/2006 | Hoffmann et al. |
| 7,054,627 B1 | 5/2006 | Hillman |
| 7,113,498 B2 | 9/2006 | Bajic |
| 7,151,795 B1 | 12/2006 | Goldburg |
| 7,164,674 B2 | 1/2007 | Shpak |
| 7,173,922 B2 | 2/2007 | Beach |
| 7,177,661 B2 | 2/2007 | Shpak |
| 7,230,920 B1 | 6/2007 | Stratigakis |
| 7,279,562 B2 | 10/2007 | Molnar-Kimber et al. |
| 7,289,463 B2 | 10/2007 | Ozugur |
| 7,319,688 B2 | 1/2008 | Shpak |
| 7,330,734 B2 | 2/2008 | Shpak |
| 7,332,640 B2 | 2/2008 | Reyes et al. |
| 7,352,770 B1 | 4/2008 | Yonge et al. |
| 7,355,994 B2 | 4/2008 | Shpak |
| 7,386,298 B2 | 6/2008 | Beach |
| 7,391,757 B2 | 6/2008 | Haddad et al. |
| 7,697,549 B2 | 4/2010 | Eran |
| 7,797,016 B2 | 9/2010 | Eran |
| 7,813,738 B2 | 10/2010 | Shpak |
| 2001/0055283 A1 | 12/2001 | Beach |
| 2002/0009982 A1 | 1/2002 | Kim |
| 2002/0048368 A1 | 4/2002 | Gardner |
| 2002/0061024 A1 | 5/2002 | Malkemes et al. |
| 2002/0080754 A1 | 6/2002 | Travostino et al. |
| 2002/0085719 A1 | 7/2002 | Crosbie |
| 2002/0093929 A1 | 7/2002 | Mangold et al. |
| 2002/0114303 A1 | 8/2002 | Crosbie et al. |
| 2002/0136183 A1 | 9/2002 | Chen et al. |
| 2002/0142771 A1 | 10/2002 | Saifullah et al. |
| 2002/0150098 A1 | 10/2002 | Sharony |
| 2002/0176386 A1 | 11/2002 | Singh |
| 2002/0188723 A1 | 12/2002 | Choi et al. |
| 2002/0197984 A1 | 12/2002 | Monin et al. |
| 2003/0003912 A1 | 1/2003 | Melpignano et al. |
| 2003/0007475 A1 | 1/2003 | Tsuda et al. |
| 2003/0012174 A1 | 1/2003 | Bender et al. |
| 2003/0014624 A1 | 1/2003 | Maturana et al. |
| 2003/0063593 A1 | 4/2003 | Koyangi et al. |
| 2003/0117973 A1 | 6/2003 | Thermond et al. |
| 2003/0133422 A1 | 7/2003 | Bims |
| 2003/0137959 A1 | 7/2003 | Nebiker et al. |
| 2003/0161340 A1 | 8/2003 | Sherman |
| 2003/0174681 A1 | 9/2003 | Gilberton |
| 2003/0181221 A1 | 9/2003 | Nguyen |
| 2003/0193946 A1 | 10/2003 | Gernert et al. |
| 2003/0206532 A1 | 11/2003 | Shpak |
| 2003/0207699 A1 | 11/2003 | Shpak |
| 2003/0210674 A1 | 11/2003 | Honkasalo et al. |
| 2003/0227892 A1 | 12/2003 | Cabana |
| 2003/0227893 A1 | 12/2003 | Bajic |
| 2003/0235170 A1 | 12/2003 | Trainin |
| 2004/0013135 A1 | 1/2004 | Haddad |
| 2004/0022176 A1 | 2/2004 | Hashimoto et al. |
| 2004/0052241 A1 | 3/2004 | Martin et al. |
| 2004/0063455 A1 | 4/2004 | Eran et al. |
| 2004/0076134 A1 | 4/2004 | Barber et al. |
| 2004/0077353 A1 | 4/2004 | Mahany |
| 2004/0103204 A1 | 5/2004 | Yegin |
| 2004/0141522 A1 | 7/2004 | Texerman et al. |
| 2004/0156399 A1 | 8/2004 | Eran |
| 2004/0160929 A1 | 8/2004 | Shpak |
| 2004/0162037 A1 | 8/2004 | Shpak |
| 2004/0170154 A1 | 9/2004 | Carter et al. |
| 2004/0184475 A1 | 9/2004 | Meier |
| 2004/0203740 A1 | 10/2004 | Won et al. |
| 2004/0204105 A1 | 10/2004 | Liang et al. |
| 2004/0223469 A1 | 11/2004 | Bahl et al. |
| 2004/0252696 A1 | 12/2004 | Kakishima et al. |
| 2004/0267896 A1 | 12/2004 | Patel et al. |
| 2005/0018630 A1 | 1/2005 | Bianchi et al. |
| 2005/0021586 A1 | 1/2005 | Bichot et al. |
| 2005/0054370 A1 | 3/2005 | Shpak |
| 2005/0063349 A1 | 3/2005 | Logalbo et al. |
| 2005/0117524 A1 | 6/2005 | Lee et al. |
| 2005/0124340 A1* | 6/2005 | Giesberts et al. .......... 455/432.1 |
| 2005/0135318 A1 | 6/2005 | Walton et al. |
| 2005/0170824 A1 | 8/2005 | Dowling |
| 2005/0180314 A1 | 8/2005 | Webster et al. |
| 2005/0195786 A1 | 9/2005 | Shpak |
| 2006/0025150 A1 | 2/2006 | Kim et al. |
| 2006/0187952 A1 | 8/2006 | Kappes et al. |
| 2006/0203772 A1 | 9/2006 | Laroia et al. |
| 2006/0209771 A1 | 9/2006 | Shpak |
| 2007/0019583 A1 | 1/2007 | Laroia et al. |
| 2007/0286143 A1 | 12/2007 | Olson et al. |
| 2008/0112373 A1 | 5/2008 | Shpak et al. |
| 2008/0175265 A1 | 7/2008 | Yonge et al. |
| 2010/0165968 A1 | 7/2010 | Shpak |
| 2011/0075752 A1* | 3/2011 | Zheng et al. .................. 375/267 |
| 2012/0020424 A1* | 1/2012 | Tong et al. ..................... 375/260 |

FOREIGN PATENT DOCUMENTS

| | | |
|---|---|---|
| EP | 1133129 A2 | 9/2001 |
| JP | 63009332 A | 1/1988 |
| JP | 3102843 A | 4/1991 |
| JP | 4027238 A | 1/1992 |
| JP | 5198268 A | 8/1993 |
| JP | 10124445 A | 5/1998 |
| JP | 2000022712 A | 1/2000 |
| JP | 2000152330 A | 5/2000 |
| JP | 2001016163 A | 1/2001 |
| JP | 2001027700 A | 1/2001 |
| WO | 0163842 A1 | 8/2001 |
| WO | 02/071627 A2 | 9/2002 |
| WO | 02091623 A1 | 11/2002 |
| WO | 2004015886 A1 | 2/2004 |
| WO | 2004015888 A1 | 2/2004 |
| WO | 2008059504 A2 | 5/2008 |

(56) References Cited

FOREIGN PATENT DOCUMENTS

OTHER PUBLICATIONS

ANSI/IEEE Standard 802.1D "Part 3: Media Access Control (MAC) Bridges", LAN/MAN Standards Committee of the IEEE Computer Society, 1998 Edition.
Atheros Communications, "Atheros Third-Generation Wireless LAN Technology Boosts Performance and Range, Reduces Power and Cost", Press Release, Sunnyvale, USA, Jun. 3, 2003.
U.S. Appl. No. 10/764,963 Official Action dated Feb. 23, 2007.
U.S. Appl. No. 10/764,963 Official Action dated Sep. 24, 2007.
U.S. Appl. No. 10/764,963 Official Action dated Jan. 25, 2008.
U.S. Appl. No. 10/764,963 Official Action dated Oct. 14, 2008.
U.S. Appl. No. 11/202,256 Official Action dated Sep. 18, 2008.
U.S. Appl. No. 11/202,256 Official Action dated Jul. 7, 2009.
U.S. Appl. No. 11/202,256 Advisory Action dated Oct. 23, 2009.
U.S. Appl. No. 11/202,256 Official Action dated Jan. 22, 2010.
European Patent Application No. 03741040.4 Search Report dated Aug. 23, 2007, and Official Action dated Jan. 15, 2009.
Japanese Patent Application No. 2004527260 Official Action dated Jan. 27, 2009.
European Patent Application No. 03808853.0 Official Action dated Apr. 23, 2009.
Japanese Patent Application No. 2006502640 Official Action dated Aug. 18, 2009.
Japanese Patent Application No. 2004527261 Official Action dated Dec. 24, 2008.
U.S. Appl. No. 10/664,631 Official Action dated Oct. 28, 2008.
U.S. Appl. No. 10/664,631 Official Action dated Dec. 30, 2009.
U.S. Appl. No. 12/716,288 Official Action dated May 27, 2010.
Chinese Patent Application # 03823903.5 Official Action dated Aug. 28, 2009.
Japanese Patent Application No. 2004544649 Official Action dated May 27, 2009.
Korean Patent Application No. 10-2005-7002273 Official Action dated Dec. 10, 2009.
Korean Patent Application No. 10-2005-7002272 Official Action dated Dec. 10, 2009.
"Laison statement on the compatibility between IEEE 802.11a and radars in the radiolocation and radionavigation service in the 5250-5350 MHz and 5470-5735 MHz bands", IEEE P802.15 regulatory, Jan. 18, 2001.
IEEE Standard 802.11n-2009, "Part 11: Wireless LAN Medium Access Control (MAC) and Physical Layer (PHY) Specifications; Amendment 5: Enhancements for Higher Throughput", Oct. 29, 2009.
Crow B.P. et al., "IEEE 802.11 Wireless Local Area Networks", IEEE Communications Magazine, vol. 35, No. 9, pp. 116-126, Sep. 1997.
Lansford et al., "Wi-Fi (802.11b) and bluetooth: Enabling Coexistence", IEEE Network, vol. 15, No. 5, pp. 20-27, Sep./Oct. 2001.
U.S. Appl. No. 10/664,631 Official Action dated May 6, 2009.
U.S. Appl. No. 10/664,631 Official Action dated Sep. 25, 2006.
U.S. Appl. No. 10/664,631 Official Action dated Apr. 9, 2007.
U.S. Appl. No. 10/664,631 Official Action dated Apr. 1, 2008.
U.S. Appl. No. 10/664,631 Official Action dated Sep. 25, 2007.

\* cited by examiner

MIMO SEARCH OVER MULTIPLE ACCESS POINTS

FIELD OF THE INVENTION

The present invention relates generally to wireless communications, and specifically to methods and devices for improving the performance of wireless local area networks.

BACKGROUND OF THE INVENTION

Wireless local area networks (WLANs) have become ubiquitous. The original WLAN standard, IEEE 802.11, was designed to enable communications at 1-2 Mbps in a band around 2.4 GHz. Subsequently, IEEE working groups defined the 802.11a, 802.11b and 802.11g extensions to the original standard, in order to enable higher data rates. In the context of the present patent application and in the claims, the term "802.11" is used to refer collectively to the original IEEE 802.11 standard and all its variants and extensions, unless specifically noted otherwise.

A recent amendment to the standard, IEEE 802.11n-2009, is designed to increase in the maximum data rate from 54 Mbit/s to 600 Mbit/s, by using multiple spatial streams. This amendment, whose full title is *IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput* (Oct. 29, 2009), is incorporated herein by reference. IEEE 802.11n mandates multiple-input multiple-output (MIMO) technology, in which multiple transmit antennas and multiple receive antennas are used to simultaneously transmit multiple spatial streams.

The maximal data rate of 600 Mbit/s under the 802.11n standard is achieved by using four such streams over respective 40 MHz-wide channels, with 64-QAM modulation and a ⅚ forward error correction (FEC) coding rate. This maximal level requires that both transmitter and receiver use at least four antennas, with excellent channel conditions. Since these operating conditions are often not achievable, the standard defines over thirty-two different modulation and coding schemes (MCSs), each with its own maximal data rate. Each scheme is denoted by a MCS index (between 0 and 31) and is characterized by a certain number of spatial streams (between one and four), a modulation type (BPSK, QPSK, 16-QAM or 64-QAM), and a coding rate (between ½ and ⅚). When two stations with 802.11n capability communicate, they choose the MCS index to use between them by a trial-and-error process. Each station makes an autonomous decision regarding the MCS to use in sending packets to its counterpart.

In a classical 802.11 WLAN, each access point operates independently of the other access points and has its own, unique basic service set identification (BSSID). On the other hand, U.S. Pat. No. 7,797,016, whose disclosure is incorporated herein by reference, describes a WLAN with central management of access points, in which the access points all share a common BSSID. Upon receiving an uplink signal, transmitted over the WLAN by a mobile station, at one or more of the access points, the access points forward uplink management and broadcast messages over a wired LAN to an access point manager. The manager selects one of the access points to respond to the mobile station. Problems of overlapping coverage areas and collisions are thus resolved, typically in favor of the access point that has the strongest reception of uplink signals from the mobile station in question.

SUMMARY OF THE INVENTION

Embodiments of the present invention that are described hereinbelow provide methods and apparatus for improving MIMO performance in a WLAN environment.

There is therefore provided, in accordance with an embodiment of the present invention, a method for communication, which includes arranging multiple access points in a wireless local area network (WLAN) to communicate over the air with a station in a multiple-input multiple-output (MIMO) configuration. Transmission quality is measured, in alternation, between two or more of the access points and the station in a plurality of different MIMO states, wherein each MIMO state is characterized at least by a respective number of spatial streams to be transmitted in the state. Responsively to the measured transmission quality, one of the access points and one of the MIMO states are selected to transmit data to the station.

In a disclosed embodiment, the access points are configured to communicate with the station over a common frequency channel and using a common basic service set identification (BSSID) for all the access points. Typically, selecting the one of the access points includes sending and receiving messages over a communication medium linking the access points in order to report the measured transmission quality and to indicate the selected one of the access points and the selected one of the MIMO states.

In some embodiments, each MIMO state is characterized by a modulation type and a forward error correction (FEC) coding rate, selected from a plurality of available modulation types and FEC coding rates, in addition to the respective number of the spatial streams. Typically, each of the access points includes multiple antennas, and the multiple antennas may be used for beam forming in at least one of the MIMO states.

In a disclosed embodiment, measuring the transmission quality includes collecting first transmission statistics for a first MIMO state, and then selecting, responsively to the first transmission statistics, a second, different MIMO state in which to collect second transmission statistics.

Typically, measuring the transmission quality includes, after selecting a first access point and a first MIMO state in which to transmit and receive the data, intermittently measuring the transmission quality for a second access point, different from the first access point, in a second MIMO state, different from the first MIMO state. Measuring the transmission quality may include measuring a respective downlink transmission throughput for each of the plurality of different MIMO states.

There is also provided, in accordance with an embodiment of the present invention, communication apparatus, including multiple access points, which are arranged in a wireless local area network (WLAN) to communicate over the air with a station in a multiple-input multiple-output (MIMO) configuration. An access manager, is coupled to control the access points so as to measure transmission quality, in alternation, between two or more of the access points and the station in a plurality of different MIMO states, each MIMO state characterized at least by a respective number of spatial streams to be transmitted in the state, and responsively to the measured transmission quality, to select one of the access points and one of the MIMO states to transmit data to the station.

The present invention will be more fully understood from the following detailed description of the embodiments thereof, taken together with the drawings in which:

DETAILED DESCRIPTION OF EMBODIMENTS

When multiple spatial streams are transmitted in a MIMO configuration, each stream is subject to different path disruptions and interference. In the indoor environments in which WLANs are commonly deployed, such disruptions and interference are unpredictable and can vary quickly. It is therefore difficult to choose the optimal MIMO state, and even after a choice has been made, it may suddenly become non-optimal or even unworkable due to changing conditions. The term "MIMO state," in the context of the present patent application and in the claims, refers to the set of variable parameters that characterize a MIMO transmission. These parameters typically comprise at least the number of spatial streams being transmitted, and may also comprise other factors, such as the modulation type and forward error correction (FEC) coding rate, as defined by IEEE 802.1n, for example.

When there are multiple access points within range of a given mobile station, as will commonly occur in the sort of WLAN configuration that is described in the above-mentioned U.S. Pat. No. 7,797,016, for example, it is also desirable to choose the optimal access point to communicate with each mobile station. Typically, the access point that gives the best signal quality at the mobile station should be chosen. The optimal MIMO state may vary among the access points, and the choice of MIMO state may affect the choice of access point, thus adding a further layer of complication. For example, it often occurs that the access point that has the highest received signal strength indicator (RSSI) for uplink signals from a given station, because it is closest to the station, gives a lower data throughput in downlink transmission to the station than another access point that is farther away but is angled more advantageously for MIMO transmission to the station.

Embodiments of the present invention that are described hereinbelow address this sort of situation, in which multiple access points in a WLAN are arranged to communicate over the air with stations in a MIMO configuration. The access points are typically centrally managed, by means of messages transmitted to and from the access points over a communication medium, such as a wired LAN. The access points are thus controlled and operated so as to measure transmission quality from different access points to a given station in various different MIMO states. Typically, different access points and MIMO states are evaluated in alternation, in a trial-and-error search. The measurements of transmission quality are used in selecting one of the access points and one of the MIMO states for transmission of data to and from the station. In this manner, the access points cooperatively search to find the best combination of access point and MIMO state for communication with each of the stations in the WLAN, as well as to update the selection of access point and MIMO state from time to time as appropriate.

Figure 1:
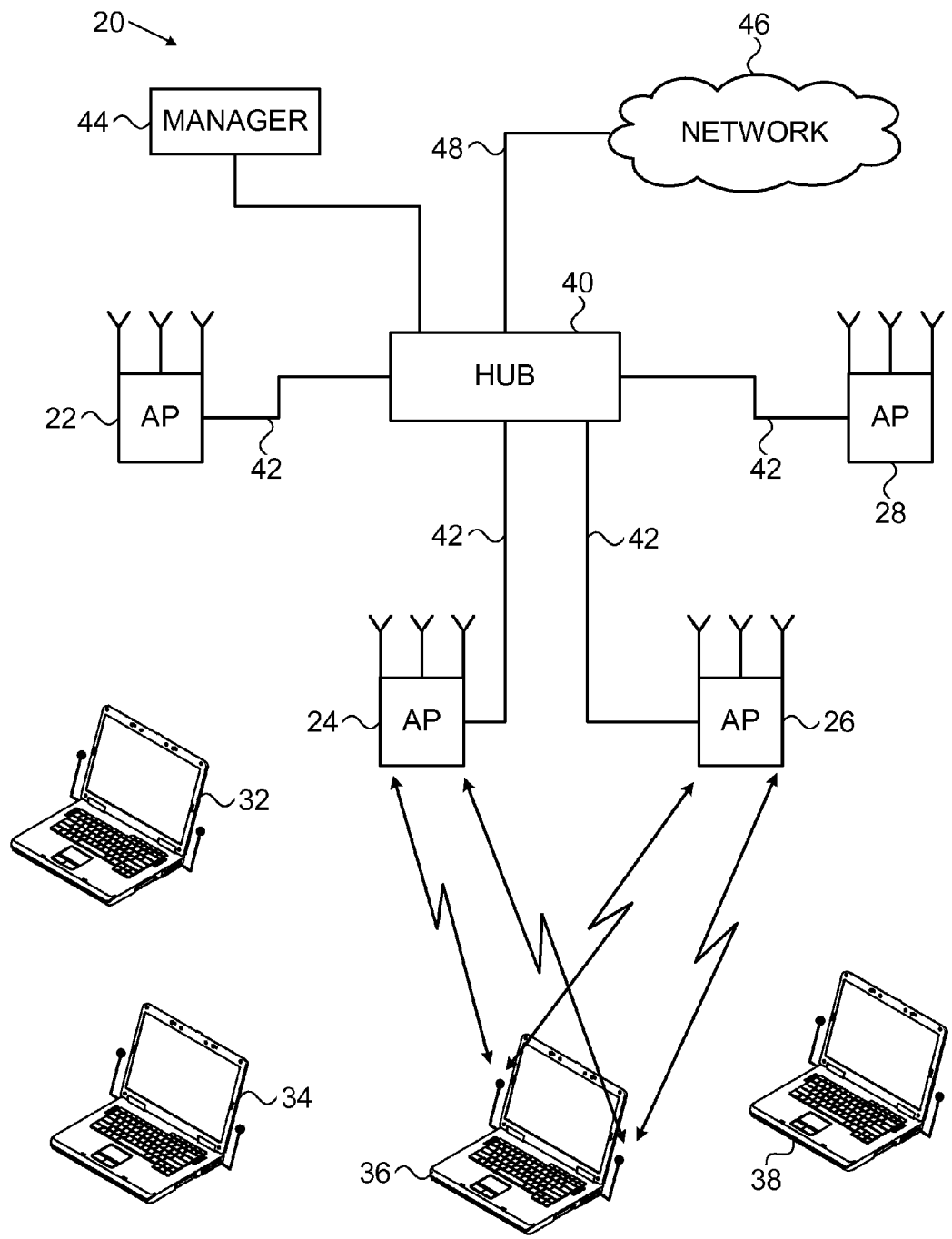
FIG. 1 is a block diagram that schematically illustrates a WLAN system, in accordance with an embodiment of the present invention.

FIG. 1 is a block diagram that schematically illustrates a wireless LAN (WLAN) system 20, in accordance with an embodiment of the present invention. System 20 comprises multiple access points 22, 24, 26, 28, which comprise MIMO radio interfaces for data communication with stations 32, 34, 36, 38. The stations typically comprise computing devices, such as desktop, portable or handheld devices, which may be mobile or stationary. In the embodiments described hereinbelow, it is assumed that the access points and stations communicate with one another in accordance with the IEEE 802.11n standard and observe the 802.11 MAC layer conventions. The principles of the present invention, however, may also be applied, mutatis mutandis, in other MIMO-enabled wireless environments.

Access points 22, 24, 26, 28 are interconnected by a communication medium, typically comprising a wired LAN 42 with a hub 40, such as an Ethernet switching hub. LAN 42 serves as the distribution system (DS) for exchanging data between the access points and the hub. Typically, the hub is also linked to an external network 46, such as the Internet, via an access line 48, so as to enable the stations to send and receive data through the access points to and from the external network.

The access points in system 20 are typically closely spaced and operate on a common frequency channel, so that the radio waves may reach each station from multiple access points simultaneously, and radio messages transmitted by a given station may be received at multiple access points. Typically, the access points share the same BSS identifier (BSSID). An access manager 44 exchanges messages with access points 22, 24, 26, 28 over LAN 42 in order to control the downlink transmissions and ensure that only one access point transmits downlink messages to any given station in the WLAN at any given time. Manager 44 selects one of the access points to communicate with each station, as well as the MIMO state to be used in these communications. Systems and managers of this sort—without MIMO capability—are described generally, for example, in U.S. Pat. Nos. 6,799,054, 7,035,243, 7,697,549 and 7,797,016, whose disclosures are incorporated herein by reference.

For conceptual clarity, manager 44 is shown as a separate unit within system 20, coupled to hub 40. In practice, the function of manager 44 may be integrated into the hub or into one of the access points, or distributed among the access points (assuming the hub or access points to have suitable processing resources for carrying out this function). Additionally or alternatively, the access points may communicate with the manager function over a dedicated medium, either wire or wireless, rather than over LAN 42. Although embodiments of the present invention may require certain modifications to the functionality of conventional 802.11n access points in order to perform the operations described herein, the novel operation of the access points and of manager 44 is transparent to stations 32, 34, 36, 38, which operate in accordance with the 802.11n standard without modification.

Usually, in system 20, when a station sends an uplink signal, the signal is received by multiple access points simultaneously. The receiving access points send messages over LAN 42 (or over another medium) to manager 44, which then selects one of the access points to acknowledge the uplink signal and send downlink communications to the station. Each of stations 32, 34, 36 and 38 is thus assigned by manager 44 to one of access points 22, 24, 26 and 28. The manager also selects the MIMO state to be used by the assigned access point. The access point preferred for transmission and MIMO state are dynamic, and may change in response to movement of the station within the service region of the WLAN or other changes in traffic or medium conditions, for example.

Figure 2:
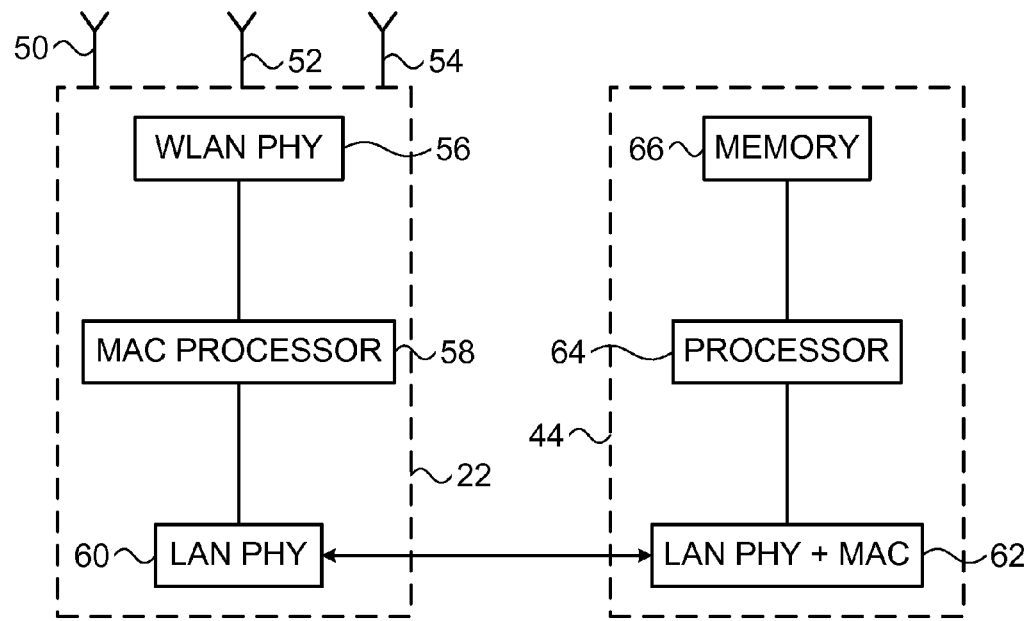
FIG. 2 is a block diagram that schematically shows functional components of an access point and access point manager, in accordance with an embodiment of the present invention.

FIG. 2 is a block diagram that schematically shows details of access point 22 and manager 44, in accordance with an embodiment of the present invention. The other access points in WLAN system 20 are typically similarly constructed. Each access point comprises a wireless physical layer interfaces (WLAN PHY) 56, comprising a radio transceiver, which transmits and receives signals in a MIMO configuration via antennas 50, 52, 54 on the appropriate frequency channel of the WLAN. In an alternative embodiment, not shown in the figures, the access points may be configured for multi-frequency operation, as described, for example, in U.S. Pat. No. 7,813,738, whose disclosure is incorporated herein by reference. Although access point 22 is shown in this figure as comprising three antennas, the access point may alternatively be configured for MIMO operation over two, four, or more antennas.

A medium access control (MAC) processor 58 performs higher-level message processing functions in conjunction with PHY 56. Processor 58 performs MAC-level processing of the uplink packets received by PHY 56 from the stations, and generates downlink packets for transmission by PHY 56, in accordance with the 802.11n standard (or any other applicable WLAN standard) and subject to instructions from manager 44. In addition, MAC processor may be responsible for messaging over LAN 42, as described above, to determine which of the access points is to serve packets to each station and in what MIMO state (MCS). For this purpose, the MAC processor is linked to LAN 42 through a LAN physical layer interface (LAN PHY) 60, typically an Ethernet PHY device.

Manager 44 communicates over LAN 42 via a LAN interface 62, typically comprising standard or custom PHY and MAC components. A processor 64 receives and transmits messages over the LAN from and to the access points via interface 62. Processor 64 typically comprises a programmable device, such as a microprocessor, which is programmed in software to carry out the functions of messaging and selection of the access point and MIMO state to be used in serving each station, as described in detail hereinbelow. This software may be downloaded to the processor in electronic form, over a network, for example, or it may, alternatively or additionally, be stored on tangible media, such as in optical, magnetic, or electronic memory media. For the purposes of access point and MIMO state selection, processor 64 records transmission quality measurements, received from the access points, in a memory 66, and refers to these measurements in making its selections. The processor may also record and use link statistics from stations to infrastructure, such as successful MCS rates per receiving access point and numbers of packets in which the retry bit is set, in order to improve its selection of transmission state per station over time. An aging criterion may be used to delete old measurements automatically.

The functional blocks of access point 22 and manager that are shown in FIG. 2 are chosen for conceptual clarity, and do not necessarily represent the physical components that might actually be used to implement the design shown here. The functional blocks shown in the figure may be combined into one or more custom or programmable integrated circuit components, or they may alternatively be broken into a larger number of custom or off-shelf components. Logical and control elements of access point 22 and manager 44 may comprise either hard-wired components or programmable components with appropriate software, as will be apparent to those skilled in the art.

Figure 3:
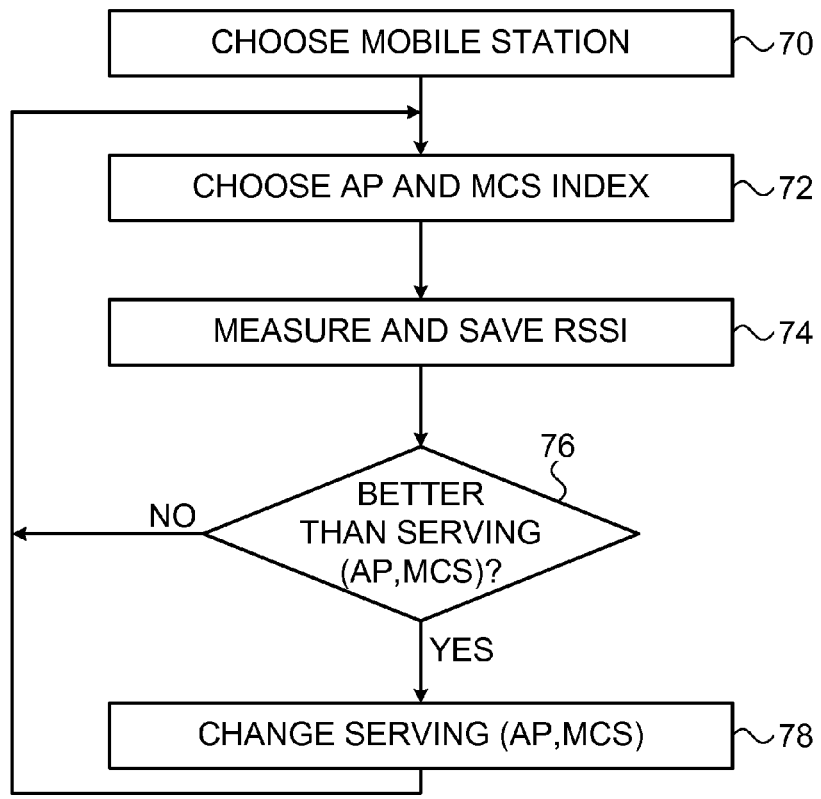
FIG. 3 is a flow chart that schematically illustrates a method for controlling communications in a WLAN system, in accordance with an embodiment of the present invention.

FIG. 3 is a flow chart that schematically illustrates a method implemented by manager 44 in selecting the access points and MIMO states to use in communicating with the stations in WLAN system 20, in accordance with an embodiment of the present invention. This method assumes that the system operates in accordance with the IEEE 802.11n standard, and some of the terminology used in the description is taken from this standard. Specifically, each MIMO state is identified by its MCS index, which indicates the number of spatial streams, the modulation type, and the coding rate, as explained above in the Background section. Manager 44 searches over tuples of the form (AP,MCS), wherein "AP" identifies the access point, and "MCS" is the MCS index, in order to find the optimal tuple for communication with each station in the WLAN. Alternatively, the search may be conducted over access points and other sets of MIMO state indicators.

For simplicity, it is assumed in this description that manager 44 chooses a certain mobile station for which to conduct the search, at a station selection step 70. In practice, the manager may perform the search for two or more of the mobile stations simultaneously, by interleaving the steps below among the stations in question. The search is typically initiated when an initial uplink message, such as an association request, from the station is received by one or more of the access points.

Manager 44 chooses a certain (AP, MCS) tuple with which to begin the search, at a tuple selection step 72. For example, the manager may initially choose the access point that reported the uplink message first or reported the highest received signal strength indicator (RSSI) in receiving the uplink message, and may subsequently test three other access points with the next-highest RSSI results. The MCS index may similarly be chosen on the basis of the RSSI, wherein typically, the higher the RSSI, the greater will be the selected MCS index. (In 802.11n convention, the data transmission bit rate increases with increasing MCS index.)

The chosen access point transmits a downlink signal to the station with MIMO configuration parameters in accordance with the MCS index, at a test transmission step 74. Based on this transmission, the access point passes test results to manager 44, including the success or failure of transmission per MCS for transmitted packets, RSSI readings of packets received from the station, and whether the "retry" bit was set in the received packets (indicating whether the packet in question was sent previously). Success or failure of transmission is indicated by whether the access point received an acknowledgment packet from the station. The quality of transmission at a given MCS may be measured in terms of the throughput, which is defined as follows:

$$\text{throughput} = \text{successful tries} * \text{max throughput} / \text{total\_number\_of\_tries}$$

For example, if twenty packets were transmitted using a MCS with a maximum throughput of 100 Mbps, and only five packets went through, then the estimated throughput for this MCS is 25 Mbps.

Manager 44 saves the measurement results in memory 66 and evaluates the accumulated results for the station in question in order to decide on the (AP,MCS) tuple to be used in data communications with the station, at an evaluation step 76. The evaluation is performed not only initially, when a station first begins to communicate over the WLAN, but also dynamically, to re-evaluate the choice of tuple in the course of communication. This re-evaluation enables the WLAN system to deal with changes in the station location and in the WLAN environment. Thus, even after the initial search for the optimal tuple has been completed, the manager will intermittently (for example, 9% of the time) choose a different (AP,MCS) tuple and instruct the access point of the tuple to make the next transmission to the station. The manager may average the throughput for a given (AP, MCS) tuple over a number of passes through step 74 in which the tuple was tested, with greater weight in the average given to more recent measurements.

Based on the evaluation at step 76, the manager may choose an initial (AP,MCS) tuple to use in serving the chosen station, or may choose a new tuple to use in subsequent data communication, at a tuple selection step 78. The manager will then use this tuple in subsequent data communication with the station, until and unless a later pass through step 76 leads to a change in the selected tuple. Thus, the manager will direct subsequent downlink transmissions to the station to be transmitted by access point AP with the chosen MCS index.

After each pass through the method of FIG. 3, manager 44 returns to step 72 in order to choose the next (AP,MCS) to evaluate. The choice is typically made by trial and error, but may be guided by prediction based on previous recent measurement results (while old results are aged out and discarded). Specifically, the RSSI readings received from an access point for a given MCS index may be used in choosing the next MCS index to try. For example, the link margin measured at the given MCS index (i.e., the difference between the actual received power according to the RSSI and the minimal power needed to enable the receiver to decode signals in the MIMO state defined by the MCS index) may be used in choosing a value for the next MCS index that is expected to be close to optimal, in terms of the tradeoff between link margin and data rate. The number of spatial streams in the next trial may be reduced if the RSSI of the weakest stream is too low, or else held constant or increased (if possible) if the RSSI is high for all streams. The search over (AP,MCS) tuples will be weighted to include more tuples from the access point or access points that give high RSSI values, but will also include other access points that are judged to be within range of the station in question.

A sample implementation of the method described above is presented in pseudo-code form in an Appendix below. The inventors ran this implementation in a WLAN configured similarly to the system of FIG. 1 (but with a larger number of access points). In actual testing, the access point with highest RSSI for a certain station achieved a throughput of 101 Mbps at the optimal choice of MCS index for that access point. When the manager was allowed to search over (AP, MCS) tuples, however, the access point with next-highest RSSI achieved a throughput of 170 Mbps to the same station by operating with a higher MCS index, with a higher number of spatial streams.

Although the embodiments described above define the MIMO state in terms of the number of spatial streams, modulation type and coding rate, in other embodiments of the present invention, the MIMO state may include other characteristics, such as beam forming parameters. (In the context of the present patent application and in the claims, multi-antenna beam forming is considered to be a type of MIMO operation.) In contrast to multi-stream MIMO, in which multiple antennas are used to add bandwidth, some beam forming applications use multiple antennas to enhance directionality and thus extend transmission reach. The method described above for searching over MIMO states may also be use, mutatis mutandis, when the states (or at least some of the states) are characterized by beam forming behavior. Thus, for example, when many rays coexist between an access point and a station, such as in a reflective open-space environment, a multi-stream MIMO state will be chosen; whereas when a single ray is much stronger than other rays, such as a clear line of sight well above ground, beam forming may be selected.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Sample Implementation

Terms in the listing below are believed to be self-explanatory in light of the explanations given above. The "window_size" parameter for a given MCS index indicates the number of downlink packets the access point is to send (i.e., the number of "tries") at that MCS, and is chosen so that the total amount of transmission time at all different transmission rates will be the same.

```
/* start with some initial mcs and ap*/
main_ap = best_rssi_ap
main_mcs = get_some_random_mcs( )
while true {
    /*get window size according to transmitting mcs*/
    sample_size = window_size(main_mcs)
    for (i-=0 ; i < sample_size ; i++) {
        /* send from main_ap at main_mcs */
        fail_success_status = send_tx( main_ap,
            main_mcs)
        /* update statistics for main_ap with
            main_mcs fail/success statistics */
        update_statistics( main_ap , main_mcs,
            fail_success_status)
    }
    /* compute throughput for main_mcs according to
        fail/success statistics */
    update_throughput(main_ap, main_mcs)
    /* reset main_mcs fail/success statistics */
    reset_statistics(main_ap, main_mcs)
    /* set best throughput ap as main_ap */
    main_ap = get_best_ap( )
    /* set best throughput mcs of best ap as main_mcs
        */
    main_mcs = get_best_mcs( )
    /* update ap list according to best rssi values*/
    ap_list = get_ap_list( )
    /* choose random ap from ap_list */
    random_ap = get_random_ap(ap_list)
    /* choose random mcs different then main_mcs */
    random_mcs = get_random_mcs(main_mcs).
    /* get 10% of window size of random_mcs */
    sample_size = window_size(random_mcs) * 0.1
    for (i-=0 ; i < sample_size ; i++) {
        /* send at random_mcs rate */
        fail_success_status = send_tx(random_ap,
            random_mcs)
        /* update main_mcs fail/success statistics
            */
        update_statistics(random_ap, random_mcs,
            fail_success_status)
    }
    /* compute throughput for random_mcs according to
        fail/success statistics */
    update_throughput(random_ap, random_mcs)
```

```
/* reset random_mcs fail/success statistics */
reset_statistics(random_ap, random_mcs)
/* set best throughput ap as main_ap */
main_ap = get_best_ap( )
/* set best throughput mcs of best ap as main_mcs
    */
main_mcs = get_best_mcs( )
}
```

The invention claimed is:

1. A method for communication, comprising:
arranging multiple access points in a wireless local area network (WLAN) to communicate over the air with a station in a multiple-input multiple-output (MIMO) configuration, wherein the access points are configured to communicate with the station over a common frequency channel and using a common basic service set identification (BSSID) for all the access points, and to communicate with an access manager over a communication medium linking the access points to the access manager;
measuring transmission quality, in alternation, between two or more of the access points and the station in a plurality of different MIMO states, each MIMO state characterized at least by a respective number of spatial streams to be transmitted in the state; and
responsively to the measured transmission quality, selecting one of the access points and one of the MIMO states to transmit data to the station by sending first messages over the communication medium from the access points to the access manager in order to report the measured transmission quality and sending second messages from the access manager to the access points to indicate the selected one of the access points and the selected one of the MIMO states.

2. The method according to claim 1, wherein each MIMO state is characterized by a modulation type and a forward error correction (FEC) coding rate, selected from a plurality of available modulation types and FEC coding rates, in addition to the respective number of the spatial streams.

3. The method according to claim 1, wherein measuring the transmission quality comprises collecting first transmission statistics for a first MIMO state, and then selecting, responsively to the first transmission statistics, a second, different MIMO state in which to collect second transmission statistics.

4. The method according to claim 1, wherein measuring the transmission quality comprises, after selecting a first access point and a first MIMO state in which to transmit and receive the data, intermittently measuring the transmission quality for a second access point, different from the first access point, in a second MIMO state, different from the first MIMO state.

5. The method according to claim 1, wherein measuring the transmission quality comprises measuring a respective downlink transmission throughput for each of the plurality of different MIMO states.

6. The method according to claim 1, wherein each of the access points comprises multiple antennas, and wherein the multiple antennas are used for beam forming in at least one of the MIMO states.

7. Communication apparatus, comprising:
multiple access points, which are arranged in a wireless local area network (WLAN) to communicate over the air with a station in a multiple-input multiple-output (MIMO) configuration, wherein the access points are configured to communicate with the station over a common frequency channel and using a common basic service set identification (BSSID) for all the access points; and
an access manager, which is linked to the access points by a communication medium and is operative to control the access points so as to cause the access points to measure transmission quality, in alternation, between two or more of the access points and the station in a plurality of different MIMO states, each MIMO state characterized at least by a respective number of spatial streams to be transmitted in the state and to report the measured transmission quality via the communication medium to the access manager, and responsively to the measured transmission quality, to select one of the access points and one of the MIMO states to transmit data to the station and to send messages over the communication medium so as to indicate the selected one of the access points and the selected one of the MIMO states.

8. The apparatus according to claim 7, wherein each MIMO state is characterized by a modulation type and a forward error correction (FEC) coding rate, selected from a plurality of available modulation types and FEC coding rates, in addition to the respective number of the spatial streams.

9. The apparatus according to claim 7, wherein the access manager is configured to collect first transmission statistics for a first MIMO state, and then to select, responsively to the first transmission statistics, a second, different MIMO state in which to collect second transmission statistics.

10. The apparatus according to claim 7, wherein the access manager is configured, after selecting a first access point and a first MIMO state in which to transmit and receive the data to and from the station, to intermittently measure the transmission quality for a second access point, different from the first access point, in a second MIMO state, different from the first MIMO state.

11. The apparatus according to claim 7, wherein the transmission quality is measured in terms of a respective downlink transmission throughput for each of the plurality of different MIMO states.

12. The apparatus according to claim 7, wherein each of the access points comprises multiple antennas, and wherein the multiple antennas are used for beam forming in at least one of the MIMO states.

* * * * *